US012396608B1

(12) United States Patent
Egan

(10) Patent No.: US 12,396,608 B1
(45) Date of Patent: Aug. 26, 2025

(54) LIT TOOLS AND POWER STORAGE

(71) Applicant: Martin Shawn Egan, Ballwin, MO (US)

(72) Inventor: Martin Shawn Egan, Ballwin, MO (US)

( * ) Notice: Subject to any disclaimer, the term of this patent is extended or adjusted under 35 U.S.C. 154(b) by 0 days.

(21) Appl. No.: 18/814,078

(22) Filed: Aug. 23, 2024

Related U.S. Application Data

(63) Continuation-in-part of application No. 18/631,857, filed on Apr. 10, 2024, now abandoned.

(51) Int. Cl.

*A47L 9/30* (2006.01)
*F21S 9/04* (2006.01)
*F21V 5/00* (2018.01)
*F21V 23/00* (2015.01)
*F21V 23/04* (2006.01)
*F21V 33/00* (2006.01)
*F21S 9/02* (2006.01)
*F21Y 105/18* (2016.01)
*F21Y 115/10* (2016.01)

(52) U.S. Cl.

CPC ................. *A47L 9/30* (2013.01); *F21S 9/043* (2013.01); *F21V 5/008* (2013.01); *F21V 23/005* (2013.01); *F21V 23/0464* (2013.01); *F21V 33/0044* (2013.01); *F21S 9/026* (2013.01); *F21Y 2105/18* (2016.08); *F21Y 2115/10* (2016.08)

(58) Field of Classification Search

CPC ............. F21V 33/0044; F21V 33/0084; F21V 2200/40; A47L 9/30; F21S 9/043; G02B 6/0096

See application file for complete search history.

(56) References Cited

U.S. PATENT DOCUMENTS 4,989,948 A * 2/1991 Dreyer, Jr. ........... G02B 5/0231 359/833
5,983,443 A * 11/1999 Redding ................... A47L 9/30 15/377
8,549,698 B1 * 10/2013 Lai ............................ A47L 9/30 15/330
2006/0096057 A1 * 5/2006 Chatfield ............. A47L 9/2857 15/339

(Continued)

*Primary Examiner* — Tracie Y Green
*Assistant Examiner* — Michael Chiang
(74) *Attorney, Agent, or Firm* — David E. Crawford; Fast Forward Law, LLC

(57) ABSTRACT

An assemblage for use with a vacuum having a conduit. The assemblage includes a light assembly including a housing and a generator having a fan rotor. The generator generates an electrical current in response to the fan rotor turning. The generator is positioned in the housing to move air across the fan rotor. The light assembly includes a circuit operatively connected to the generator and a light emitting device. The circuit energizes the light emitting device to emit light energy in response to receiving the electrical current from the generator. The light assembly also includes a lens aligned with the light emitting device for concentrating the light energy. The assemblage includes a tool assembly including a light transmitting body mounted adjacent to the lens. The tool assembly includes a cover surrounding the light transmitting body to prevent light energy from being emitted through the cover.

19 Claims, 5 Drawing Sheets

(56) References Cited

U.S. PATENT DOCUMENTS

| | | | | |
|---|---|---|---|---|
| 2007/0240275 | A1* | 10/2007 | Willenbring | A47L 9/30<br>15/324 |
| 2012/0047679 | A1* | 3/2012 | Peng | A47L 9/2805<br>15/339 |
| 2016/0209575 | A1* | 7/2016 | Fukui | G02B 6/0031 |
| 2018/0202626 | A1* | 7/2018 | Thoday | B60R 13/005 |
| 2021/0331216 | A1* | 10/2021 | He | A47L 9/30 |
| 2022/0265107 | A1* | 8/2022 | Knight | A47L 7/0014 |

* cited by examiner

LIT TOOLS AND POWER STORAGE

CROSS-REFERENCE TO RELATED APPLICATIONS

The present application is a continuation-in-part of co-pending U.S. patent application Ser. No. 18/631,857 entitled, "LIT TOOLS AND POWER STORAGE" filed on Apr. 10, 2024, which is hereby incorporated by reference in its entirety.

BACKGROUND

Vacuums have been in use for more than 100 years and are common in residences and commercial properties. Over time, vacuums have been modified to attract consumer attention to increase sales and meet consumer needs. Currently, more than 25 major manufacturers sell vacuums in the United States. In this competitive market, consumers are attracted to vacuums by price, features, and convenience. Existing vacuums have a range of features including attachments such as crevice tools, brushes, floor tools, and wands that help users during cleaning.

Crevice tools are used to clear debris from small areas such as between couch cushions, under furniture and appliances, and beside appliances. Current crevice tools work well in narrow spaces, but those spaces are usually not well lit. When spaces are not lit, users cannot see what the vacuum is picking up and may not know when the space is free of debris.

Brushes are used to clean shelves, pictures, computers, blinds, and delicate items. Many shelves are not directly lit, making it difficult to see what the tool is contacting and picking up. Because items on shelves may be fragile, it is important the user be aware of where the brush is in relation to the items. The usefulness of current brushes is limited because they do not offer the ability to illuminate the area being cleaned.

As the popularity of hardwood floors increases, vacuum manufacturers offer more vacuum attachments for bare cleaning bare floors. These tools are intended to pick up debris such as sand and serial crumbs from bare floors, which can be difficult. Some vacuums tend to push granular debris around. Worse, some roller brushes scatter the debris rather than picking it up. Like other tools or attachments, hardwood floor tools are sometimes used in dimly lit areas such as beneath tables, making it difficult for users to see whether debris is picked up. In addition to being less helpful to users, low light areas slow users down because additional passes may be needed to ensure the area is clean.

Some high-end residential vacuums offer lit tools that are powered by electrified hoses and couplers. The added complexity needed to deliver electricity to the tools through hoses and couplers increases the cost of these vacuums. Thus, most residential vacuums do not have lit tools, and it is believed no commercial vacuums offer lit tools. Thus, there is a need for a simpler and more economical way to power lit tools for residential and commercial vacuums.

SUMMARY

In one aspect, the present disclosure includes an assemblage for use with a vacuum to remove dust and debris from a selected surface by drawing air through an interior passage of a conduit. The conduit has a length extending from a vacuum end to a tool end opposite the vacuum end. The assemblage comprises a light assembly capable of connecting to the tool end of the conduit. The light assembly includes a housing having a hollow interior in fluid communication with the interior passage of the conduit when the light assembly is connected to the tool end of the conduit. The light assembly also includes a generator having a fan rotor. The generator generates an electrical current in response to the fan rotor turning. The generator is positioned in the housing to move air across the fan rotor thereby turning the fan rotor, so the generator generates the electrical current when air is being drawn though the housing and the interior passage of the conduit. Further, the light assembly includes a circuit positioned in the housing operatively connected to the generator and a light emitting device. The circuit energizes the light emitting device to emit light energy in response to receiving the electrical current from the generator. The light assembly also includes a lens mounted in the housing and aligned with the light emitting device for concentrating the light energy emitted by the light. In addition, the assemblage comprises a tool assembly adapted to connect to the light assembly housing. The tool assembly has an interior passageway extending from a downstream port in fluid communication with the hollow interior of the housing when the tool assembly is connected to the light assembly housing to an upstream opening through which air is drawn when removing dust and debris from the selected surface. The tool assembly includes a light transmitting body having an input surface and a light emitting tip opposite the input end. The input surface is mounted adjacent to the lens when the tool assembly is connected to the light assembly so light energy concentrated by the lens enters the light transmitting body through the input surface and is transmitted through the body to the light emitting tip. The tool assembly also includes a cover surrounding the light transmitting body to prevent light energy transmitted through the light transmitting body from being emitted through the cover.

In another aspect, the present disclosure includes an assemblage for use with a vacuum to remove dust and debris from a selected surface by drawing air through an interior passage of a flexible hose. The flexible hose has a length extending from a vacuum end to a tool end opposite the vacuum end. The assemblage comprises a light assembly capable of connecting to the tool end of the flexible hose. The light assembly includes a housing having a hollow interior in fluid communication with the interior passage of the flexible hose when the light assembly is connected to the tool end of the flexible hose. The light assembly also includes a generator having a fan rotor. The generator generates an electrical current in response to the fan rotor turning. The fan rotor is aligned with an opening in the housing across the fan rotor thereby turning the fan rotor, so the generator generates the electrical current when air is being drawn though the housing and the interior passage of the flexible hose. In addition, the light assembly includes a circuit positioned in the housing operatively connected to the generator and a light emitting device. The circuit energizes the light emitting device to emit light energy in response to receiving the electrical current from the generator. Further, the light assembly includes a lens mounted in the housing and aligned with the light emitting device for concentrating the light energy emitted by the light on an output surface of the lens. The assemblage also comprises a tool assembly adapted to connect to the light assembly housing. The tool assembly has an interior passageway extending from a downstream port in fluid communication with the hollow interior of the housing when the tool assembly is connected to the light assembly housing to an upstream opening through which air is drawn when removing dust and debris from the selected surface. The tool assembly includes a light transmitting body having a tubular section defining at least a portion of the interior passageway. The light transmitting body has an input surface mounted adjacent to the output surface of the lens when the tool assembly is connected to the light assembly so light energy passes from the output surface of the lens to the input surface of the light transmitting body and is transmitted through the tubular section of the light transmitting body. The tool assembly also comprises a cover surrounding the light transmitting body assembly to prevent light energy transmitted through the light transmitting body from being emitted through the cover. The cover has a shaped opening to allow light energy to be emitted through the shaped opening.

In yet another aspect, the present disclosure includes an assemblage for use with a vacuum to remove dust and debris from a selected surface by drawing air through an interior passage of a flexible hose. The flexible hose has a length extending from a vacuum end to a tool end opposite the vacuum end. The assemblage comprises a light assembly capable of connecting to the tool end of the flexible hose. The light assembly includes a housing having a hollow interior in fluid communication with the interior passage of the flexible hose when the light assembly is connected to the tool end of the flexible hose. The housing includes an orifice extending from outside the housing to the hollow interior. The light assembly also includes a generator having a fan rotor. The generator generates an electrical current in response to the fan rotor turning. The fan rotor is in fluid communication with the orifice in the housing to move air across the fan rotor when air is being drawn though the housing, so the fan rotor rotates causing the generator to generate the electrical current. In addition, the light assembly includes an annular printed circuit board having a central opening and a plurality of light emitting diodes spaced around the central opening. The printed circuit board is positioned in the housing and operatively connected to the generator and the plurality of light emitting diodes to energize the plurality of light emitting diodes to emit light energy in response to receiving the electrical current from the generator. Further, the light assembly includes a series of lenses mounted in the housing. Each lens of the series of lenses has a central aperture aligned with the central opening in the printed circuit board, so light energy emitted by the plurality of light emitting diodes is concentrated by the series of lenses on an output surface of said series of lenses. The assemblage also comprises a tool assembly adapted to connect to the light assembly housing. The tool assembly has an interior passageway extending from a downstream port in fluid communication with the hollow interior of the housing when the tool assembly is connected to the light assembly housing to an upstream opening through which air is drawn when removing dust and debris from the selected surface. The tool assembly includes a light transmitting body having an input surface and a light emitting tip opposite the input end. The input surface is mounted adjacent to the output surface of the series of lenses when the tool assembly is connected to the light assembly so light energy concentrated by the series of lens enters the light transmitting body through the input surface and is transmitted through the body to the light emitting tip. The tool assembly also includes a cover surrounding the light transmitting body to prevent light energy transmitted through the light transmitting body from being emitted through the cover.

Other aspects of the present disclosure will be apparent in view of the following description and claims.

BRIEF DESCRIPTION OF DRAWINGS

The present disclosure includes non-limiting examples illustrated in the accompanying drawings.

Corresponding reference characters indicate corresponding parts throughout the drawings.

DETAILED DESCRIPTION

Figure 1:
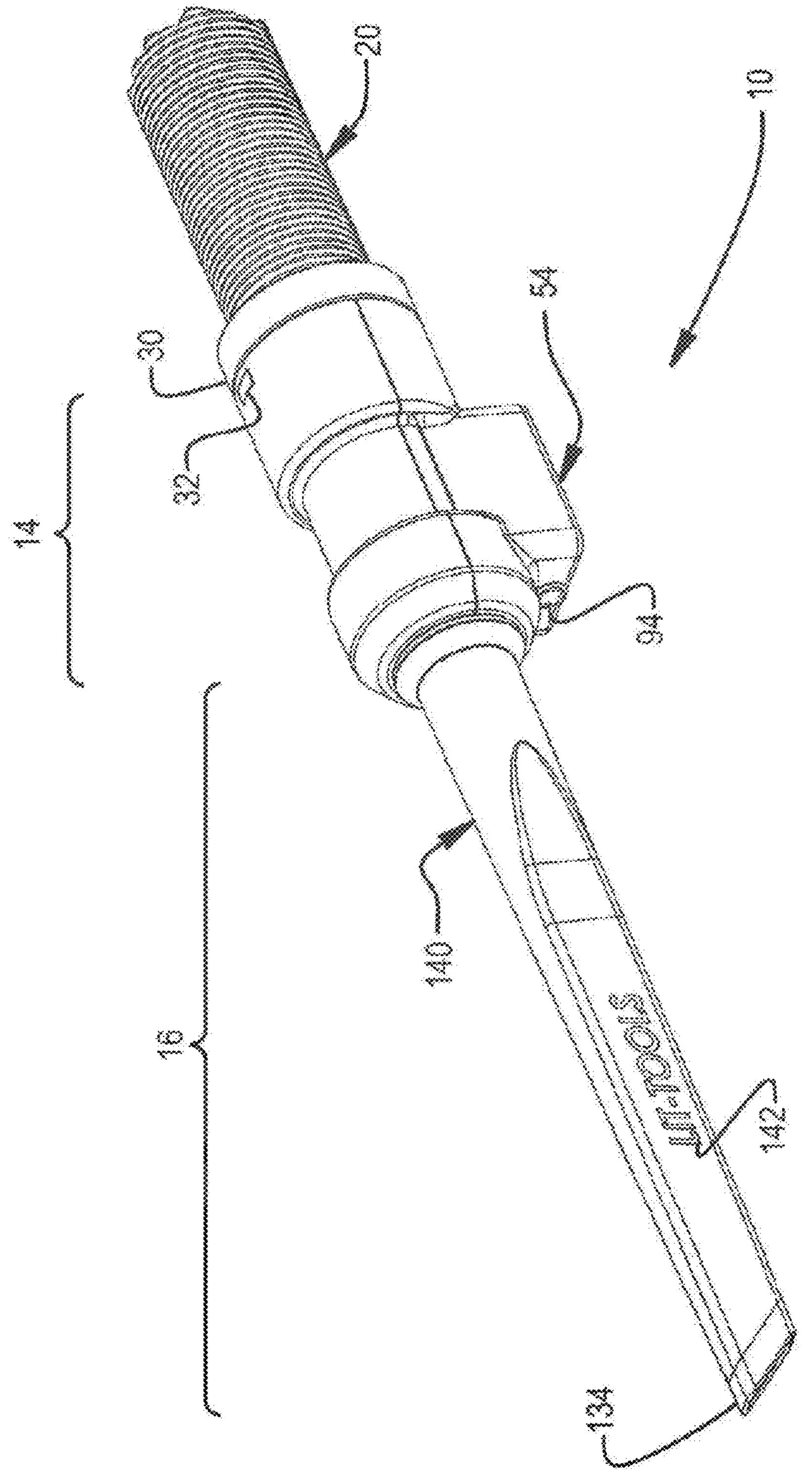
FIG. 1 is a first fragmentary perspective of an example of a lit tool assemblage for use with a vacuum cleaner.
Figure 2:
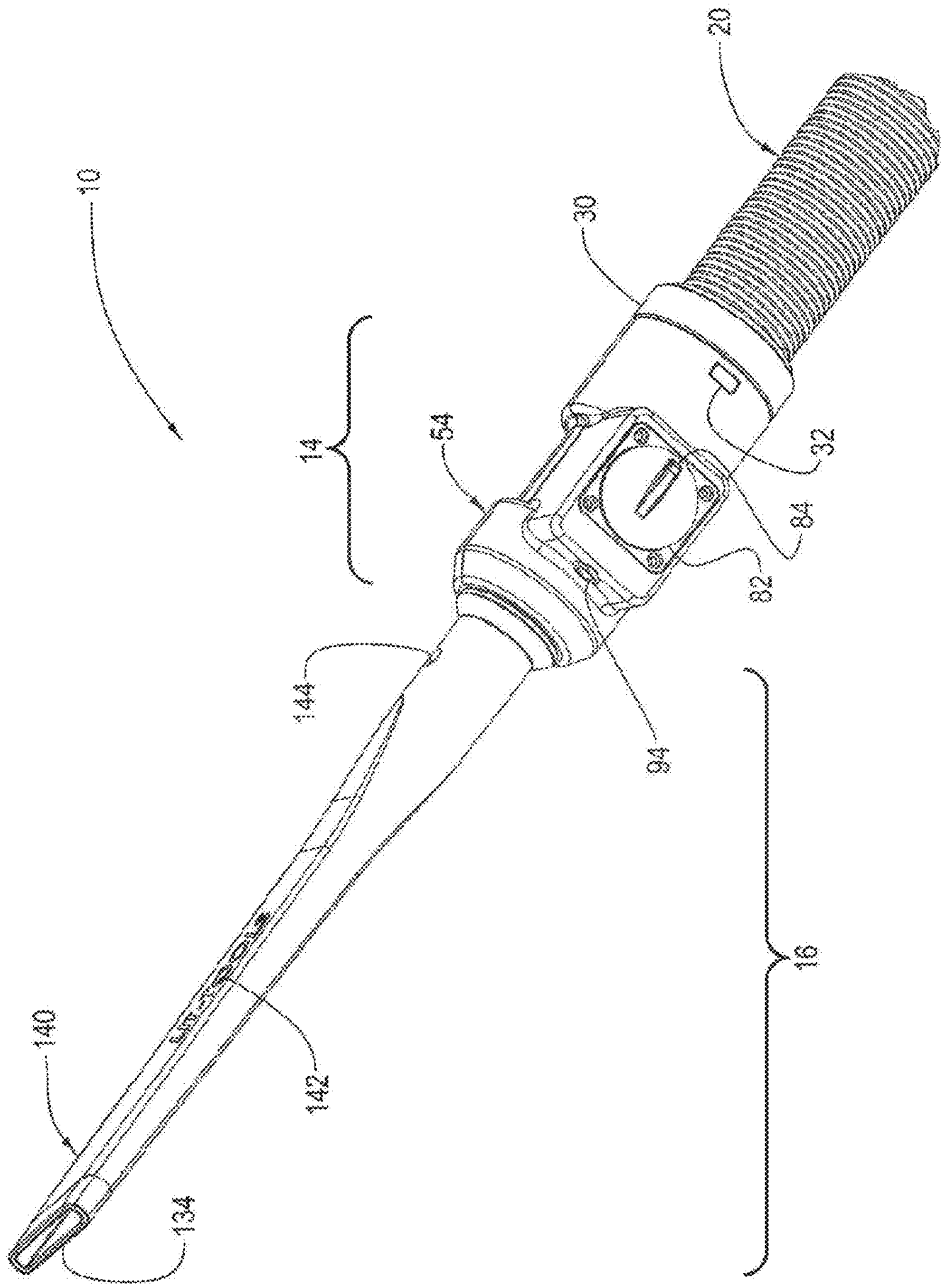
FIG. 2 is a second fragmentary perspective of the example of FIG. 1.

Referring to the drawings and in particular FIGS. 1 and 2, a lighted or lit tool assemblage of a vacuum cleaner or vacuum is designated in its entirety by reference number 10. The lit tool assemblage 10 generally comprises a hose assembly (generally designated by 12), a self-powered light assembly (generally designated by 14), and a lighted or lit tool assembly (generally designated by 16). The hose assembly 12 is operatively connected to a conventional vacuum cleaner (not shown) that pulls air through the tool assembly 16 and light assembly 14 to pick up dust and debris and pull it into a collection bag or cannister (not shown) where the dust and debris are held for subsequent disposal. As will be explained in more detail, the self-powered light assembly 14 generates electricity using a small amount of air (e.g., less than five cubic feet per minute) pulled through the assemblage 10 by the vacuum. The self-powered light assembly 14 uses the generated electricity to produce light that is transmitted to the lit tool assembly 16. The light is emitted from the lit tool assembly 16 to illuminate adjacent surfaces to aid users in directing the tool assembly to surfaces having dust and debris.

Figure 3:
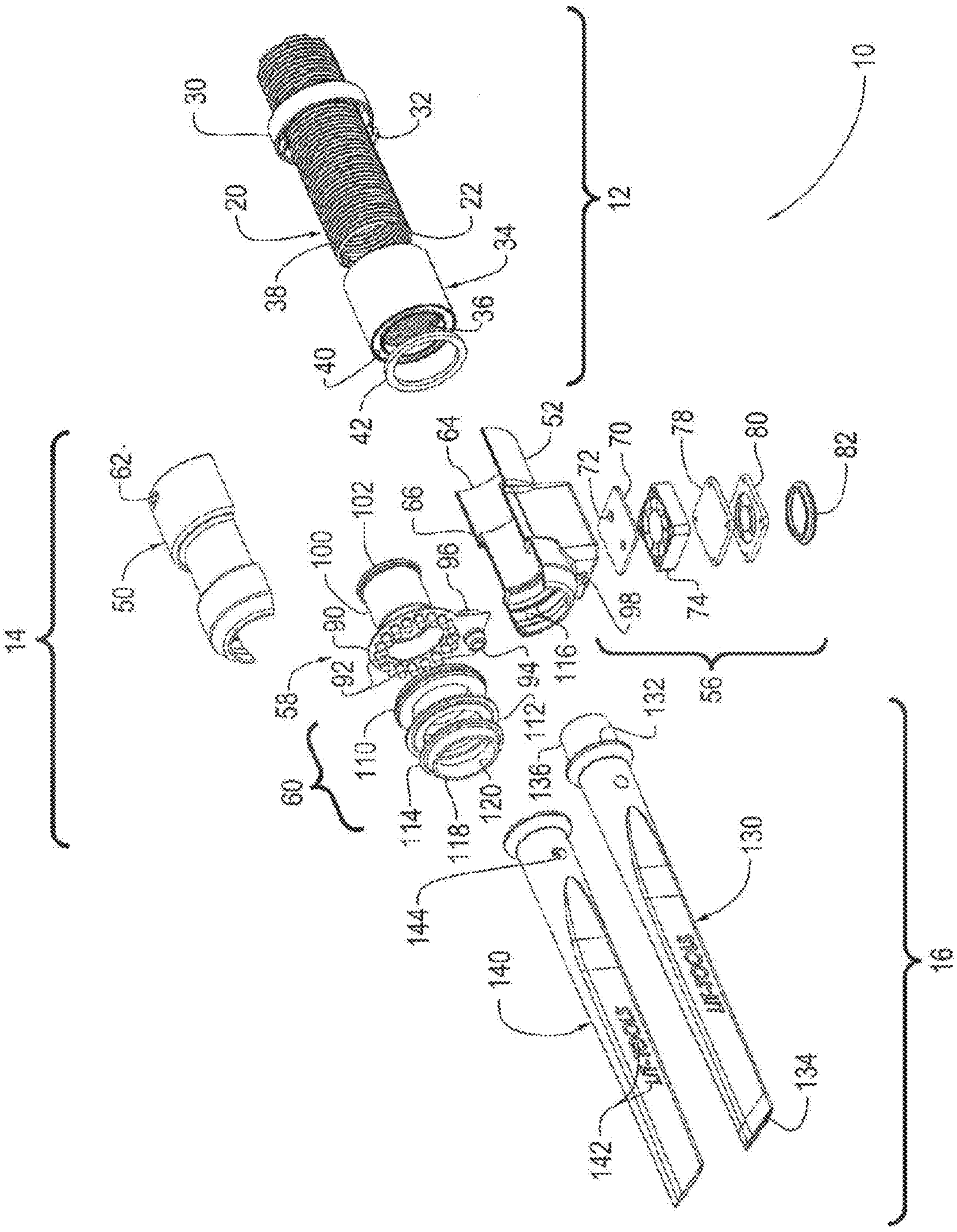
FIG. 3 is a first separated fragmentary perspective of the example.
Figure 4:
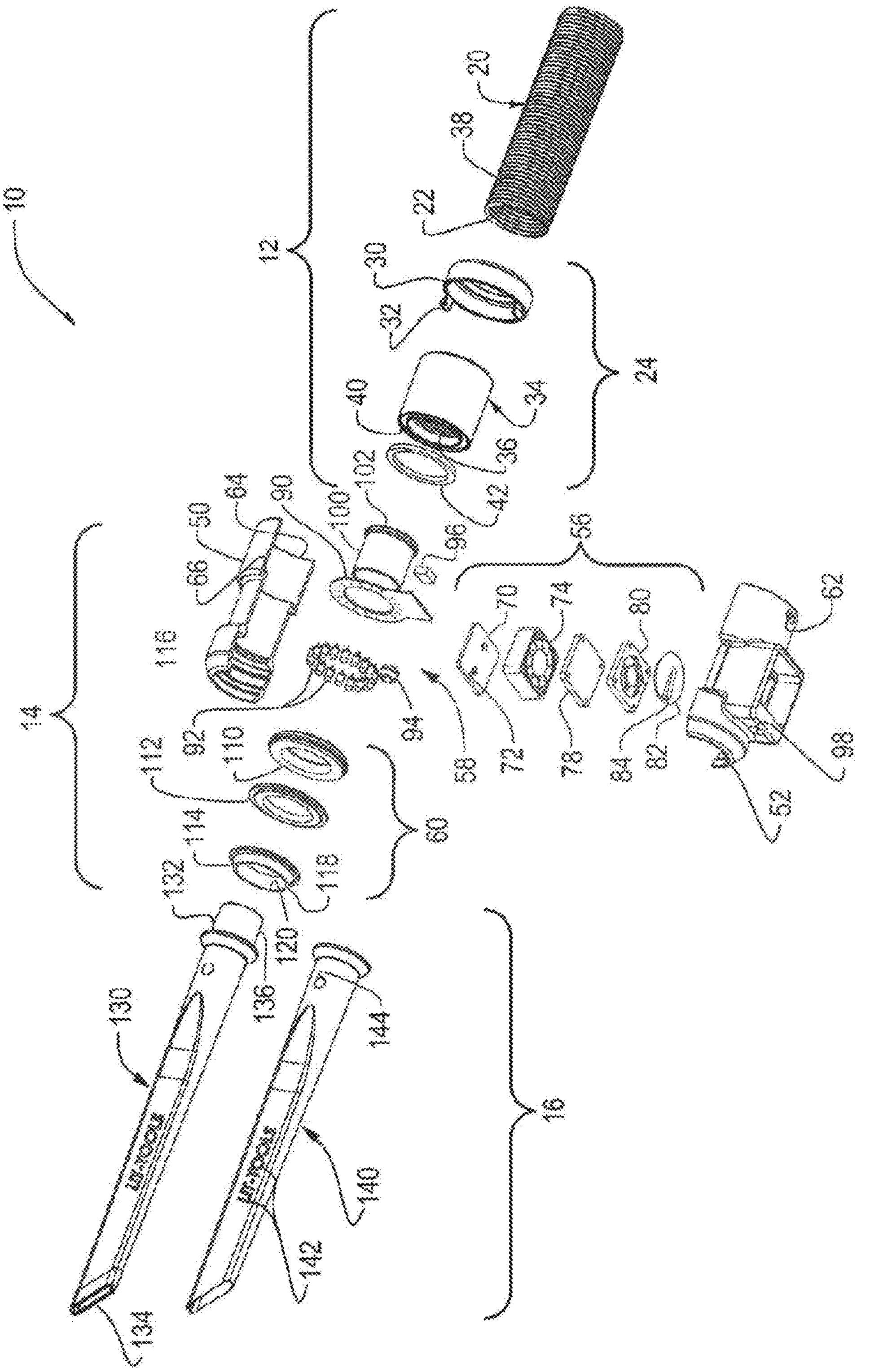
FIG. 4 is a second separated fragmentary perspective of the example.

As shown in FIGS. 3 and 4, the hose assembly 12 comprises a flexible hose, or more broadly a conduit, generally designated by 20, having a length (partially shown) extending between a vacuum end (not shown) and a tool end 22, as well as a connector assembly, generally designated by 24, for joining the hose assembly to the self-powered light assembly 14. Although the conduit 20 is referred to as a flexible hose throughout this description, it should be understood the conduit may include a rigid tube (i.e., a wand attachment). Further, it is envisioned the conduit may take the form of an adaptor for retrofitting a preexisting vacuum hose or wand attachment. The connector assembly 24, is adapted to releasably connect the light assembly 14 to the hose assembly 12. The connector assembly 24 includes a collar 30 having opposed cantilevered detent clips 32 configured to releasably attach the collar to the light assembly 14. The connector assembly 24 also includes a tubular fitting, generally designated by 34, that is attached to the tool end 22 of the hose 20. In the illustrated example, threads or circumferential ridges 36 are formed on an inner surface of the fitting 34. These ridges 36 are configured to engage corresponding ridges 38 on an exterior surface of the hose 20. In one example, the interlocking ridges 36, 38 on the fitting 34 and hose 20 are bonded together with an adhesive to prevent the fitting from turning independently with respect to the hose. It is envisioned that the fitting 34 and hose 20 may be joined using other methods including by providing them with a modest interference fit. A seat 40 is provided on an end of the fitting 34 for receiving a seal ring 42 to pneumatically seal an interface between the hose assembly 12 and the light assembly 14 as will be explained.

As further shown in FIGS. 3 and 4, the light assembly 14 includes an upper housing shell 50 and a lower housing shell 52 that are joined to form a housing, generally designated by 54 (FIGS. 1 and 2). Although the shells 50, 52 may be joined using other conventional methods, such as using adhesives, screw fasteners, or snap connectors, the illustrated shells are joined by sonic welding. The housing 54 has a hollow interior sized and shaped for receiving a fan-driven generator assembly (generally designated by 56), a lighting assembly (generally designated by 58), and a lens assembly (generally designated by 60). A generally rectangular opening 62 is provided adjacent to a downstream end (i.e., farthest from the tool assembly 16) of each housing shell 50, 52 for receiving the detent clips 32 extending from the collar 30 of the connector assembly 24 to releasably connect the hose assembly 12 to the housing 54. A cylindrical receiver opening 64 extends inward into the downstream end of the housing 54. The receiver opening 64 is sized and shaped for receiving the tubular fitting 34 of the connector assembly 24. As will be appreciated, the hose assembly 12 and light assembly 14 are joined by inserting the tubular fitting 34 into the receiver opening 64 and pushing the collar 30 against the housing 54 while deflecting the detent clips inward and aligning them with the rectangular openings 62 of the upper and lower housing shells 50, 52. Once aligned with the openings 62 the clips 32 resiliently move outward to engage the openings to keep the hose assembly 12 and light assembly 14 together. To separate the hose assembly 12 and light assembly 14, a user presses the clips 32 inward until they disengage the openings 62 so the hose assembly and light assembly can be pulled apart. When the hose assembly 12 and light assembly 14 are joined, the seal ring 42 on the fitting 34 presses against an annular land 66 formed at an upstream end of the receiver opening 64 to pneumatically seal the components and prevent outside air from being drawn through the connection. Although the connector assembly 24 described in this description releasably connects the light assembly 14 to the hose assembly 12, it is envisioned that alternative examples of the connector assembly may permanently join the light assembly and the hose assembly. In addition, it is envisioned that the connector assembly 24 may be part of the light assembly 14 and be configured to connect to a preexisting vacuum hose or wand accessory.

As also shown in FIGS. 3 and 4, the fan-driven generator assembly 56 comprises an orifice plate 70 having openings or orifices 72 sized to limit flow through the generator assembly to minimize air used to power the lighting assembly 58. Although the orifices may have other sizes, the illustrated orifices 72 are sized to limit air flow to five cubic feet per minute so only a small percentage of air pulled through the self-powered light assembly 14 by the vacuum. By minimizing air used to power the light assembly 14, suction is maintained upstream at the tool assembly 16. The orifices 72 are positioned to pull air through a DC generator 74 mounted upstream from the orifice plate 70. As will be appreciated by those skilled in the art, the DC generator 74 generates direct current when air is pulled across a bladed rotor or fan inside the generator. As the vacuum pulls air through the generator 74, its bladed rotor rotates causing the generator to generate an electrical current. As should be appreciated, the DC generator 74 may be constructed from a DC fan. Rather than applying a direct current to the fan motor causing the motor to rotate a fan, air is moved (i.e., blown or drawn) across the fan to rotate the motor, causing it to act as a generator and produce direct current. A filter 78 and a grate or grating 80 are mounted on an inlet of the generator 74 to protect the fan from damage. Further, a cover 82 having an inlet port 84 is attached to the grate 80. The electric current generated by the generator 74 is used to power the lighting assembly 58.

The lighting assembly 58 comprises a generally annular printed circuit board (PCB) or more broadly a circuit 90 having a plurality of light-emitting diodes (LEDs) or more broadly a light-emitting device 92 arranged in a circle about the PCB. As those skilled in the art will appreciate, it is envisioned that other types of light emitting devices may be used instead of the LEDs, including incandescent, fluorescent, halogen, xenon, or other conventional light emitting elements. Although the illustrated PCB is annular and the LEDs are arranged in a circle, it is envisioned that these components may have other configurations. In the illustrated example, a photocell 94 is provided on the PCB 90 for detecting whether the surface being vacuumed is sufficiently illuminated without energizing the LEDs 92. When the LEDs 92 are not lit, the electrical current produced by the generator assembly 56 may be directed to a battery 96 for storage. Although the battery may be located in other locations, the illustrated battery 96 is mounted on the circuit board 90. The stored power may be used to power the LEDs 92 when suction is unavailable or to reduce power requirements when the generator 74 is operating. An opening 98 is provided in the lower shell housing 52 to accommodate the photocell 94. The PCB 90 may also include a conventional manually operable switch (not shown) for selectively energizing the LEDs 92. A hollow sleeve 100 mounted in the housing 54 extends through the PCB 90 to provide a smooth passageway inside the lighting assembly 58. In addition to shielding components of the lighting assembly 58 from debris-filled air passing through the sleeve 100, it is envisioned that the smooth passageway created by the sleeve may reduce aerodynamic losses that would otherwise result from air passing over the components of the lighting assembly. The illustrated sleeve 100 includes a flange 102 that rests against the annular land 66 in the housing 54 and held in position by the land and the seal ring 42 on the connector assembly 24.

The illustrated lens assembly 60 comprises a series of three lenses 110, 112, 114 mounted in grooves 116 provided in the upper and lower housing shells 50, 52. The illustrated lenses 110, 112, 114 are made from optically clear polycarbonate or other resin. Lens 110 is configured to direct light emitted by the LEDs 92 into a narrow ring on lens 112. Lens 112 is a fractal lens configured to further focus and direct the light as needed to create a narrower, more concentrated ring of light on lens 114, which is also a fractal lens. Lens 114 is configured to concentrate the light from lens 112 at a planar output surface 118. In addition to focusing and directing light, the third lens 114 also includes a central aperture 120 that receives a portion of the tool assembly 16 as will be explained.

Figure 5:
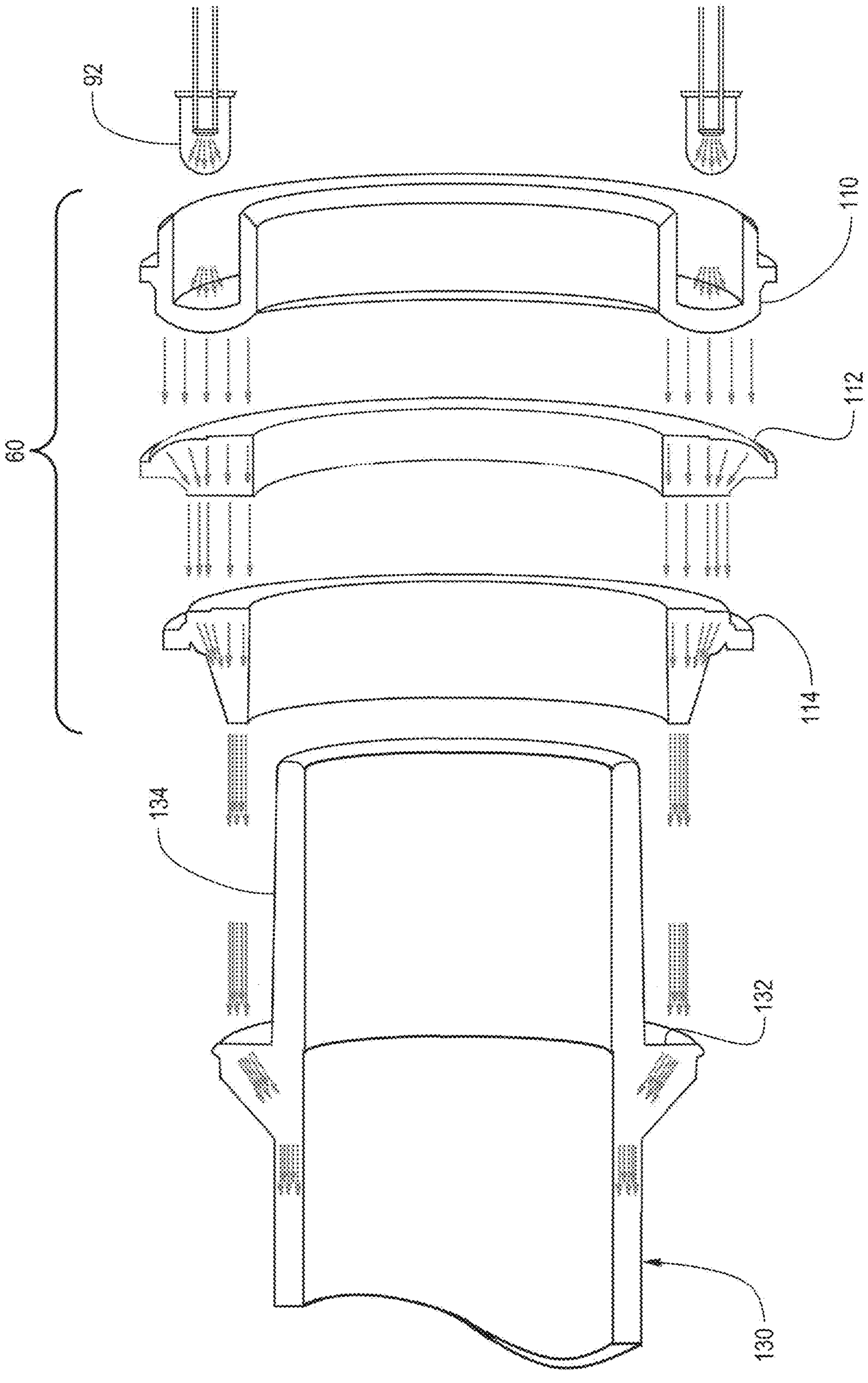
FIG. 5 is a cross section of a lens assembly of the lit tool assemblage.

In the illustrated example shown in FIG. 5, the first lens 110 is a toroidal concavo-convex lens, which spreads light entering the lens along an arc providing a bean-shaped light pattern. In some examples, the bean-shaped light patterns resulting from adjacent LEDs 92 may overlap circumferentially to provide a more constant flux distribution. Further, the concavo-convex cross-sectional shape of the first lens 110 may collimate light exiting the lens. The second lens 112 is a fractal lens, having an outer portion shaped differently than its inner portion. The inner portion of the second lens 112 is a flat lens having parallel faces so light enters through a planar face and exits through a parallel planar face. The outer portion of the second lens 112 is shaped so light enters through a toroidal skewed convex face that concentrates the light and directs it toward the same planar face that light exiting the inner portion passes. Thus, the second lens 112 concentrates light so it leaves the lens in a narrower ring pattern. In the illustrated example, the third lens 114 is also a fractal lens. Similar to the second lens 112, the inner portion of the third lens 114 is formed as a flat lens so light entering the inner portion leaves at an angle equal to that at which it enters the lens. The outer portion of the third lens 114 has an annular prism shape that directs and concentrates light entering the outer portion toward the same planar face through which light exits when traveling through the inner portion of the third lens 114. Thus, the third lens concentrates light still further into a narrow ring pattern corresponding to the light input surface 132 of the lit tool assembly 10.

Historically the determining the lens parameters needed to create the desired optics required lengthy mathematical computations and/or iterative experimentation, but today the parameters may be determined using optical design software. For example, the lenses and other optical characteristics (e.g., lens spacing) may be determined using optics design software such as PHOTOPIA™ optics design software in combination with computer-aided-design software such as RHINOCEROS®. PHOTOPIA optics design software is available from LTI Optics, LLC of Westminster, Colorado. RHINOCEROS is a federally registered trademark of TLM, Inc., a Washington corporation doing business as Robert McNeel & Associates in Seattle, Washington. In addition to lenses, it is envisioned that the optics may include reflectors (e.g., parabolic reflectors) and other optical elements (e.g., fiber optic bundles) to direct light. As will be appreciated, the lens assembly may have other numbers of lenses and lens having different shapes. For example, it is envisioned that the optics may have a GOBO projector design in which light travels through a collimator before passing through an image plate having an arcuate opening matching a desired arcuate portion of the input surface 132. Alternatively, it is envisioned that the GOBO projector design may include an optical condenser between the LED and the image plate and an objective lens between the image plate and the light input surface 132.

The lit tool assembly 16 comprises a light pipe or transmitting body, generally designated by 130, that directs light generated in the light assembly 16 from a light input surface 132 to a light emitting tip 134 adapted to direct light toward a surface being vacuumed. The body 130 includes a tubular connector 136 sized and shaped to be pressed through the aperture 120 in the third lens 114 to join the tool assembly 16 to the light assembly 14. The mating surfaces are configured so the input surface 132 of the body 130 is aligned with the output surface 118 of the lens 114. Thus, light transmitted through the lens 114 is directed into the input surface 132. The tool assembly 16 also includes an over-molding or cover, generally designated by 140, surrounding the body 130 to prevent light users seeing light transmitted through the body and improve light transmission through the body. In the illustrated example, the cover 140 has shaped openings 142 through which the body 130 is visible. The openings 142 may be configured to create an illuminated marking or marker (e.g., an illuminated logo, graphic, or other indicia) for providing information or an aesthetic design on the tool assembly 16. The illustrated tool assembly 16 includes a circular opening 144 allowing light to be emitted so a user can visually confirm light is being transmitted to the body 130. As will be appreciated, the cover 140 is shorter than the body 130 to expose the light emitting tip 134 of the body so light is able to pass through corresponding side portions of the body to illuminate a surface being vacuumed. In addition to the cover 140, the body 130 may include surface coatings or treatments to improve light transmission through the body. It is envisioned that body 130 may have other surface treatments to improve light emission where the body is exposed. Although the illustrated tool assembly 16 is a crevice tool, those skilled in the art will appreciate that vacuum tools having other configurations may be modified to include provisions for lighting. Such other tools include brushes, floor tools, and wands, as well as other conventional vacuum attachments.

Although the illustrated hose assembly 12 is of the type used with canister or upright vacuum cleaners, those skilled in the art will appreciate the lit tool end 10 may be adapted for use with a whole-house vacuum system. Those skilled in the art will appreciate that the lit tool end 10 has applicability to both commercial and residential vacuum cleaners, including shop vacuums and vacuum systems. Further, it is envisioned that the lit tool end 10 may include a conventional wand handle or wand extension instead of or in addition to the flexible hose assembly.

Those skilled in the art should understand the generator assembly 56 may be located at positions along the airstream other than between the lit tool assembly 16 and the tool end 22 of the conduit 20. For example, the generator assembly 56 may be positioned in the tool assembly 16. More particularly, the generator assembly 56 may be positioned within a housing of a tool assembly. In addition, the generator assembly 56 may be used to power other vacuum subassemblies or devices. For example, the generator assembly may be used to power BLUETOOTH® or wi-fi equipment. BLUETOOTH is a federally registered trademark of Bluetooth SIG, Inc., a Delaware corporation having an office in Kirkland, Washington. Using the generator assembly to power other electrical or electronic devices is also contemplated.

It should be noted that the generator assembly 56 may be used along airstreams regardless of their direction of flow. For example, the generator assembly 56 may be positioned along a hose connected to a compressor. Further, the generator assembly 56 may be modified for use with different fluids. One modified assembly would be used along a pressurized water or hydraulic line. In the case of incompressible fluids, the fan would be optimized to be a turbine. For example, the generator (turbine) assembly could be positioned along a remote pipeline to generate power needed to power satellite communications to transmit operational information or fault indications to a distant control room.

When introducing elements in this description and the claims, the articles "a", "an", "the", and "said" are intended to indicate one or more of the elements. The terms "comprising", "including", and "having" are intended to be inclusive and indicate there may be additional elements other than the listed elements.

As those skilled in the art could make various changes to the above constructions, products, and methods without departing from the intended scope of the description, all matter in the above description and accompanying drawings should be interpreted as illustrative and not in a limiting sense. The patentable scope of the disclosure is defined by the claims, and can include other constructions and methods that would occur to those skilled in the art. Such other constructions are intended to be within the scope of the claims if the structural elements of the constructions do not differ from the literal language of the claims, or if the constructions include equivalent structural elements having insubstantial differences from the literal languages of the claims.

To the extent that the specification, including the claims and accompanying drawings, discloses any additional subject matter that is not within the scope of the claims below, the disclosures are not dedicated to the public and the right to file one or more applications to claims such additional disclosures is reserved.

The invention claimed is:

1. An assemblage for use with a vacuum to remove dust and debris from a selected surface by drawing air through an interior passage of a conduit, said conduit having a length extending from a vacuum end to a tool end opposite the vacuum end, said assemblage comprising:

a light assembly capable of connecting to the tool end of the conduit, the light assembly including:

a housing having a hollow interior in fluid communication with the interior passage of the conduit when the light assembly is connected to the tool end of the conduit;

a generator having a fan rotor, the generator generating an electrical current in response to the fan rotor turning, said generator being positioned in the housing to move air across the fan rotor thereby turning the fan rotor so the generator generates the electrical current when air is being drawn through the housing and the interior passage of the conduit;

a circuit positioned in the housing operatively connected to the generator and a light emitting device, said circuit energizing the light emitting device to emit light energy in response to receiving the electrical current from the generator; and a lens mounted in the housing and aligned with the light emitting device for concentrating the light energy emitted by the light emitting device; and a tool assembly adapted to connect to the light assembly housing, said tool assembly having an interior passageway extending from a downstream port in fluid communication with the hollow interior of the housing when the tool assembly is connected to the light assembly housing to an upstream opening through which air is drawn when removing dust and debris from the selected surface, said tool assembly including:

a light transmitting body having an input surface and a light emitting tip opposite the input surface, the input surface being mounted adjacent to the lens when the tool assembly is connected to the light assembly so light energy concentrated by the lens enters the light transmitting body through the input surface and is transmitted through the body to the light emitting tip; and a cover surrounding the light transmitting body to prevent light energy transmitted through the light transmitting body from being emitted through the cover;

wherein the light assembly and the tool assembly are selectively separable.

2. An assemblage as set forth in claim 1, wherein:

the circuit comprises a printed circuit board; and the light emitting device comprises a light emitting diode.

3. An assemblage as set forth in claim 2, wherein:

the printed circuit board has a central opening;

said light emitting diode is a first light emitting diode; and the light assembly comprises a plurality of light emitting diodes arranged around the central opening of the printed circuit board including said first light emitting diode.

4. An assemblage as set forth in claim 3, wherein the lens has a central aperture aligned with the central opening in the printed circuit board.

5. An assemblage as set forth in claim 4, wherein:

the lens is a first lens;

the light assembly comprises a plurality of lenses including said first lens; and each lens in said plurality of lenses has a central aperture aligned with the central opening in the printed circuit board.

6. An assemblage as set forth in claim 4, wherein the light transmitting body has a tubular section defining at least a portion of the interior passageway.

7. An assemblage as set forth in claim 4, wherein the tool assembly is a crevice tool.

8. An assemblage as set forth in claim 1, wherein the light assembly further comprises a photocell operatively connected to the circuit to deenergize the light emitting device when ambient light exceeds a predetermined level.

9. An assemblage as set forth in claim 1, wherein the light assembly further comprises a switch operatively connected to the circuit to selectively control the light emitting device.

10. An assemblage as set forth in claim 1, wherein the cover of the tool assembly includes shaped openings to allow light energy to be emitted through the cover.

11. An assemblage as set forth in claim 1, in combination with the conduit.

12. An assemblage as set forth in claim 11, in combination with the vacuum.

13. An assemblage for use with a vacuum to remove dust and debris from a selected surface by drawing air through an interior passage of a flexible hose, said flexible hose having a length extending from a vacuum end to a tool end opposite the vacuum end, said assemblage comprising:

a light assembly capable of connecting to the tool end of the flexible hose, the light assembly including:

a housing having a hollow interior in fluid communication with the interior passage of the flexible hose when the light assembly is connected to the tool end of the flexible hose;

a generator having a fan rotor, the generator generating an electrical current in response to the fan rotor turning, the fan rotor being aligned with an opening in the housing so air moving through the opening moves across the fan rotor thereby turning the fan rotor so the generator generates the electrical current when air is being drawn through the opening and the interior passage of the flexible hose;

a circuit positioned in the housing operatively connected to the generator and a light emitting device, said circuit energizing the light emitting device to emit light energy in response to receiving the electrical current from the generator; and a lens mounted in the housing and aligned with the light emitting device for concentrating the light energy emitted by the light on an output surface of the lens; and a tool assembly adapted to connect to the light assembly housing, said tool assembly having an interior passageway extending from a downstream port in fluid communication with the hollow interior of the housing when the tool assembly is connected to the light assembly housing to an upstream opening through which air is drawn when removing dust and debris from the selected surface, said tool assembly including:

a light transmitting body having a tubular section defining at least a portion of the interior passageway, the light transmitting body having an input surface mounted adjacent to the output surface of the lens when the tool assembly is connected to the light assembly so light energy passes from the output surface of the lens to the input surface of the light transmitting body and is transmitted through the tubular section of the light transmitting body; and a cover surrounding the light transmitting body assembly to prevent light energy transmitted through the light transmitting body from being emitted through the cover, the cover having a shaped opening to allow light energy to be emitted through the shaped opening.

14. An assemblage as set forth in claim 13, wherein the tool assembly is a crevice tool.

15. An assemblage for use with a vacuum to remove dust and debris from a selected surface by drawing air through an interior passage of a flexible hose, said flexible hose having a length extending from a vacuum end to a tool end opposite the vacuum end, said assemblage comprising:

a light assembly capable of connecting to the tool end of the flexible hose, the light assembly including:

a housing having a hollow interior in fluid communication with the interior passage of the flexible hose when the light assembly is connected to the tool end of the flexible hose, the housing including an orifice extending from outside the housing to the hollow interior;

a generator having a fan rotor, the generator generating an electrical current in response to the fan rotor turning, said fan rotor being in fluid communication with the orifice in the housing to move air across the fan rotor when air is being drawn through the housing, so the fan rotor rotates causing the generator to generate the electrical current;

an annular printed circuit board having a central opening and a plurality of light emitting diodes spaced around the central opening, the printed circuit board being positioned in the housing and operatively connected to the generator and the plurality of light emitting diodes to energize the plurality of light emitting diodes to emit light energy in response to receiving the electrical current from the generator; and a series of lenses mounted in the housing, each lens of said series of lenses having a central aperture aligned with the central opening in the printed circuit board, so light energy emitted by the plurality of light emitting diodes is concentrated by the series of lenses on an output surface of said series of lenses; and a tool assembly adapted to connect to the light assembly housing, said tool assembly having an interior passageway extending from a downstream port in fluid communication with the hollow interior of the housing when the tool assembly is connected to the light assembly housing to an upstream opening through which air is drawn when removing dust and debris from the selected surface, said tool assembly including:

a light transmitting body having an input surface and a light emitting tip opposite the input surface, the input surface being mounted adjacent to the output surface of the series of lenses when the tool assembly is connected to the light assembly so light energy concentrated by the series of lens enters the light transmitting body through the input surface and is transmitted through the body to the light emitting tip; and a cover surrounding the light transmitting body to prevent light energy transmitted through the light transmitting body from being emitted through the cover.

16. An assemblage as set forth in claim 15, wherein the light transmitting body has a tubular section defining at least a portion of the interior passageway.

17. An assemblage as set forth in claim 16, wherein the cover of the tool assembly includes shaped openings to allow light energy to be emitted through the cover.

18. An assemblage as set forth in claim 15, wherein the cover of the tool assembly includes shaped openings to allow light energy to be emitted through the cover.

19. An assemblage as set forth in claim 15, wherein the tool assembly is a crevice tool.

* * * * *